United States Patent [19]
Giovanardi

[11] Patent Number: 5,826,808
[45] Date of Patent: Oct. 27, 1998

[54] MOBILE COMPACTOR, PULVERIZER AND CUTTING APPARATUS AND METHOD THEREFOR

[76] Inventor: Enrico Giovanardi, 1435 N. Hayden Rd., Scottsdale, Ariz. 85257

[21] Appl. No.: 888,713

[22] Filed: Jul. 7, 1997

Related U.S. Application Data

[63] Continuation-in-part of Ser. No. 623,870, Mar. 29, 1996, Pat. No. 5,683,042.

[51] Int. Cl.$^6$ .......................... B02C 13/04; B02C 21/02
[52] U.S. Cl. ............. 241/27; 241/101.76; 241/101.762; 241/101.763; 241/189.1; 241/194
[58] Field of Search .................. 241/27, 101.2, 241/101.76, 101.762, 101.763, 101.742, 189.1, 194

[56] References Cited

U.S. PATENT DOCUMENTS

| | | | |
|---|---|---|---|
| 1,828,681 | 10/1931 | Reinking | 241/101.7 |
| 2,368,331 | 1/1945 | Seaman | 241/101.7 |
| 2,491,739 | 12/1949 | LaDow | 241/101.71 |
| 4,193,457 | 3/1980 | Sphar | 241/101.7 X |
| 4,961,452 | 10/1990 | Den Besten et al. | 241/101.7 |
| 5,209,412 | 5/1993 | Dwyer et al. | 241/101.7 |

*Primary Examiner*—John M. Husar
*Attorney, Agent, or Firm*—John D. Titus; Bryan Cave LLP

[57] ABSTRACT

The present invention is directed to a mobile hammermill apparatus for pulverizing and compacting waste and soil in road construction, disaster cleanup, forestry, agriculture, and particularly at landfill sites, in a single operation. The mobile apparatus achieves superior compaction densities by using a plurality of compacting and pulverizing members that are mounted rotatably on a plurality of eccentrically mounted shafts running parallel to a main shaft, which rotates to cause the compacting and pulverizing members to impact the surface beneath the apparatus. The rear of the apparatus is supported by a compactor drum which provides a shield to prevent debris from being ejected from the rear of the compactor and provides a mass to compact the pulverized waste and soil as the apparatus is moved across the surface of the landfill.

30 Claims, 7 Drawing Sheets

MOBILE COMPACTOR, PULVERIZER AND CUTTING APPARATUS AND METHOD THEREFOR

BACKGROUND OF THE INVENTION

This application is a C.I.P. of U.S. patent application Ser. No. 08/623,870, filed Mar. 29, 1996, now U.S. Pat. No. 5,683,042.

This invention relates generally to an apparatus and method for compacting and pulverizing waste and soil in road construction, disaster cleanup, forestry, agriculture, and particularly at landfill sites.

Use of either a self-propelled or towed compacting apparatus in a landfill environment presents special challenges. There are several stages to a compacting process at a landfill. First, it is necessary to compact the waste product that is being dumped at the landfill. As is to be expected, such waste product can take many forms, including for example typically, rather small household garbage items (e.g., food containers, food waste, old newspapers, etc.) to larger items from industrial and construction sites. With respect particularly though not exclusively to the latter, it is not uncommon for wire, tubing, hoses, plastics, concrete, scrap metal and other like debris to be dumped at a landfill site. After the waste product is compacted, the compactor apparatus must then compact onto the layer of waste a layer of soil, upon which another layer of waste will ultimately be placed—a process that typically will repeat itself until the landfill reaches its maximum desired or lawful height.

Because virtually all landfills face maximum landfill height restrictions, and because it can often be politically and/or financially difficult to expand or enlarge existing landfills or create new ones, it is preferable for the compactor apparatus to compact the waste and soil layers as densely as possible, so that the landfill space may be utilized as efficiently as possible. Prior art methods of compacting waste by driving heavy equipment repeatedly over the waste are capable of achieving compaction densities of only about 1200 lbs/yd$^3$ (700 kg/m$^3$) or less.

An improved mobile compacting apparatus is disclosed in co-pending U.S. patent application Ser. No. 08/623,870 now U.S. Pat. No. 5,683,042 which is incorporated herein by reference and in which this application is a C.I.P. thereof. According to the improved mobile compacting apparatus disclosed therein, a plurality of compacting and pulverizing members are mounted to freely swing on a plurality of eccentric shafts mounted on a central main shaft. The eccentric shafts rotate about the main shaft, driving the pulverizing and compacting members, which flail against the surface being compacted. As the compactor is pulled across the surface of the landfill, the pulverizing and compacting members swinging from the rotating eccentric shafts impact the surface and pulverize the waste, soil and other materials passing underneath the compactor. By pulverizing and compacting the waste in this manner, compaction densities of 2400 lbs/yd$^3$ (1400 kg/m$^3$) and greater have been demonstrated.

Where a mobile compactor and pulverizer apparatus is used in an environment, for example a landfill, where wire, tubing, concrete, industrial debris, scrap metal and other like materials are present, such materials, when struck by the pulverizing and compacting members may occasionally be propelled from beneath the compactor rather than being compacted into the landfill. Furthermore, although the improved compactor and pulverizer apparatus conditions the waste and soil to make the increased compaction densities possible, the surface of the landfill must still be physically compacted by driving heavy machinery repeatedly over the surface of the landfill. The need for the heavy machinery in addition to the compactor and pulverizer apparatus presents an obvious cost obstacle, especially for small to medium-sized municipal landfills.

Therefore, a need existed for an improved combined mobile compactor and pulverizer apparatus and method for compacting and pulverizing waste and soil, particularly at landfill and other sites where wire, tubing, hoses, plastics, concrete, scrap metal and other like materials can be present. The improved compactor and pulverizing apparatus and method must be able to efficiently and densely compact and pulverize most waste products and soil without the possibility of ejecting debris from beneath the pulverizer, and preferably is able to compact and pulverize most waste product and soil in a single-pass operation rather than a multiple-step operation comprising a pulverization pass followed by multiple compaction passes using other heavy equipment.

SUMMARY OF THE INVENTION

It is an object of the present invention to provide an improved combined mobile compactor, pulverizer and cutting apparatus and method therefor.

It is another object of the present invention to provide an improved combined mobile compactor, pulverizer and cutting apparatus and method that will permit the dense compacting and cutting of waste and soil.

It is still another object of the present invention to provide an improved combined mobile compactor, pulverizer and cutting apparatus and method that is capable of operating in an environment where wire, tubing, hoses, plastics, concrete, scrap metal and other like materials are present without the likelihood of debris being ejected from beneath the compactor.

It is yet a further object of the present invention to provide an improved combined mobile compactor, pulverizer and cutting apparatus and method that is capable of cutting, pulverizing and compacting waste in a single-pass operation.

A mobile compactor apparatus constructed in accordance with the principles of the present invention, comprises a compactor which includes plurality of compacting, cutting and/or pulverizing members that are mounted to swing freely on a plurality of shafts, which in turn are mounted eccentrically on a central main shaft. The eccentric shafts revolve about the main shaft, driving the cutting, pulverizing and compacting members, which cut, compact and pulverize waste and soil and other materials passing underneath the compactor. In one embodiment, a single compacting drum mounted at the rear of the compactor apparatus supports at least a portion of the weight of the mobile compactor apparatus. The drum, which extends substantially the entire width of the compactor apparatus, or wider, acts as a shield to prevent debris from being ejected toward the rear of the compactor apparatus, while at the same time providing a load to compact the pulverized waste passing beneath the compacting drum. In another embodiment, the drum is split into two or more segments oriented end-to-end, which combine to extend substantially the entire width of the compactor apparatus to provide the same shielding/compacting function in an assembly that is easier to turn around a corner.

BRIEF DESCRIPTION OF THE DRAWINGS

The present invention will be better understood from a reading of the following detailed description, taken in conjunction with the accompanying drawings in which like references designate like elements and, in which.

DETAILED DESCRIPTION OF THE PREFERRED EMBODIMENTS

Figure 1:
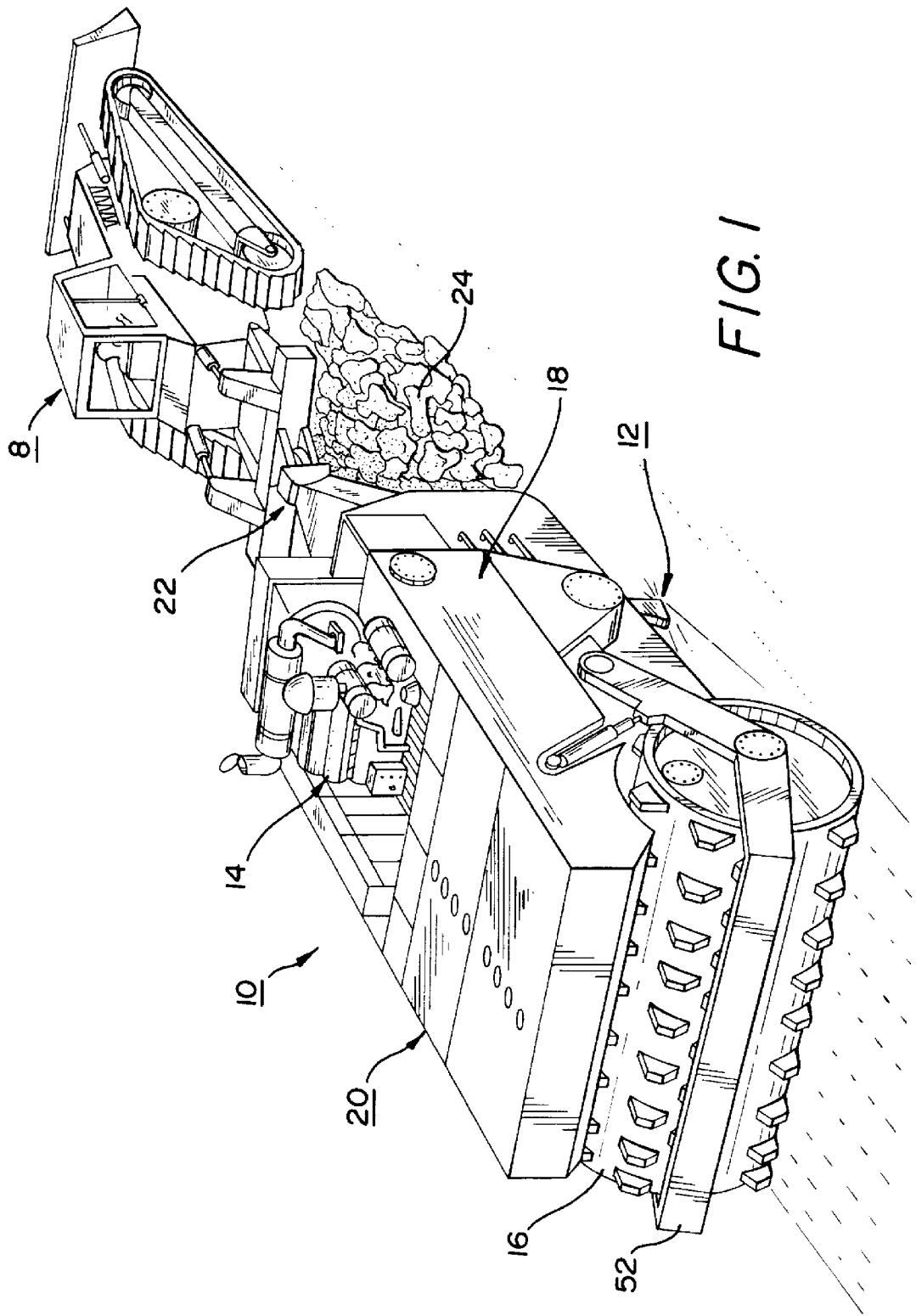
FIG. 1 is a perspective view of an embodiment of the combined mobile compactor, pulverizer and cutting apparatus of the present invention which is towed by another vehicle.

The drawing figures are intended to illustrate the general manner of construction and are not to scale. In the description and in the claims the terms left, right, front and back and the like are used for descriptive purposes. However, it is understood that the embodiment of the invention described herein is capable of operation in other orientations than is shown and the terms so used are only for the purpose of describing relative positions and are interchangeable under appropriate circumstances.

Referring to the embodiment of FIG. 1, reference number 10 refers generally to the combined mobile compactor, pulverizer and cutting apparatus of this invention. Referring to FIG. 1, the compactor, pulverizer and cutting apparatus 10 comprises a hammermill 12 (which will be described more specifically below in reference to FIGS. 2–5), a power plant 14 for providing a means for operating the compactor, pulverizer and cutting apparatus 10, compactor drum 16, a transmission apparatus 18, a chassis or housing 20, and a coupling member 22. As shown in FIG. 1, the compactor, pulverizer and cutting apparatus 10 is shown in a setting where debris 24 is present.

In the preferred embodiment, the power plant 14 is a Caterpillar 3408 TA diesel powerplant, which delivers 465 bhp. However, the power plant 14 may comprise a different powerplant capable of producing substantially the same amount of bhp without departing from the spirit or scope of the present invention. As described more fully hereinafter, the compactor drum 16 serves several functions including providing a safety shield to prevent objects struck by the hammermill 12 from being ejected from underneath compactor apparatus 10, and providing a compacting mass. The transmission apparatus 18 comprises a transmission having flexible joints and a drive chain or belt so as to give the compactor, pulverizer and cutting apparatus 10 enhanced resistance to impacts during operation, and a heavy duty centrifugal clutch that will allow the hammermill 12 to begin rotating slowly and which will release automatically when a difference in rotation speed between the power plant 14 and the hammermill 12 occurs. Without departing from the spirit or scope of the invention, the centrifugal clutch may be replaced with a torque converter. The housing 20 is preferably comprised of thick, heavy gauge steel and constructed to be able to withstand the type of punishing treatment that can be encountered during operation of the compactor, pulverizer and cutting apparatus 10 in a landfill or other similar environment. The housing 20 is open at the bottom surface to permit the hammermill 12 to pulverize the surface passing underneath the compactor apparatus 10. The coupling member 22 is in the form of an eyelet, and permits the compactor, pulverizer and cutting apparatus 10 to be releasably coupled to a tractor or other vehicle that has the ability to pull the compactor, pulverizer and cutting apparatus 10 during operation. A towing vehicle, such as a conventional bulldozer 8 may be used to trailer the compactor apparatus 10.

Figure 2:
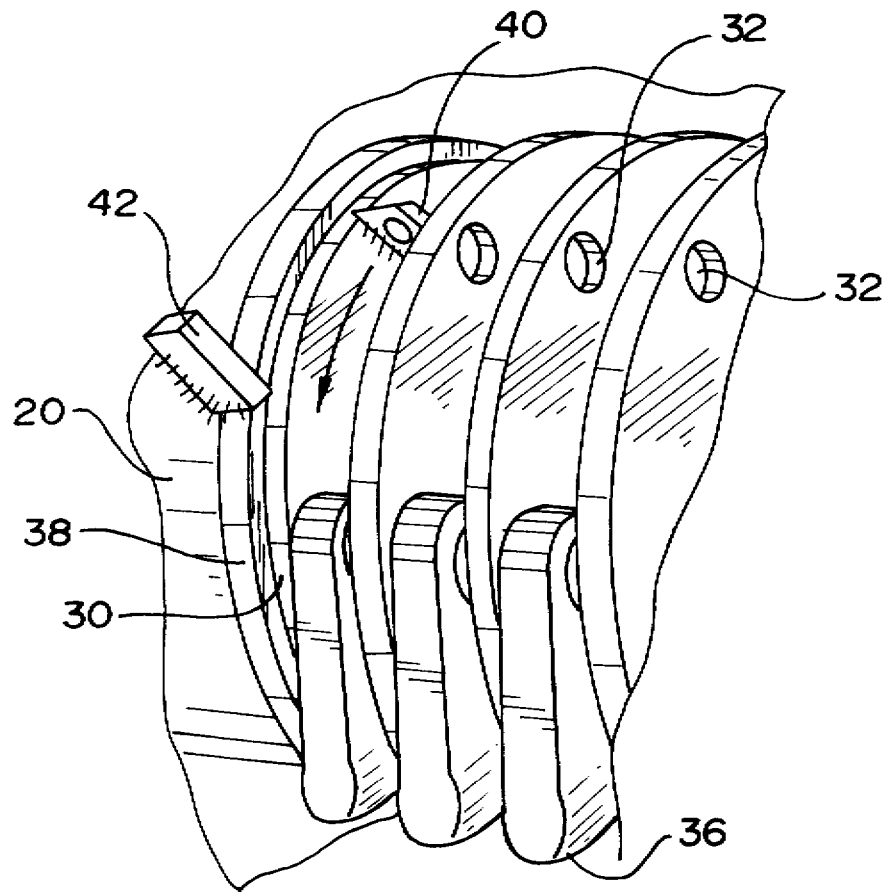
FIG. 2 is a partial, perspective view of the present invention, showing a portion of the compactor members, spacing members, and cutting means of the present invention.
Figures 4, 5:
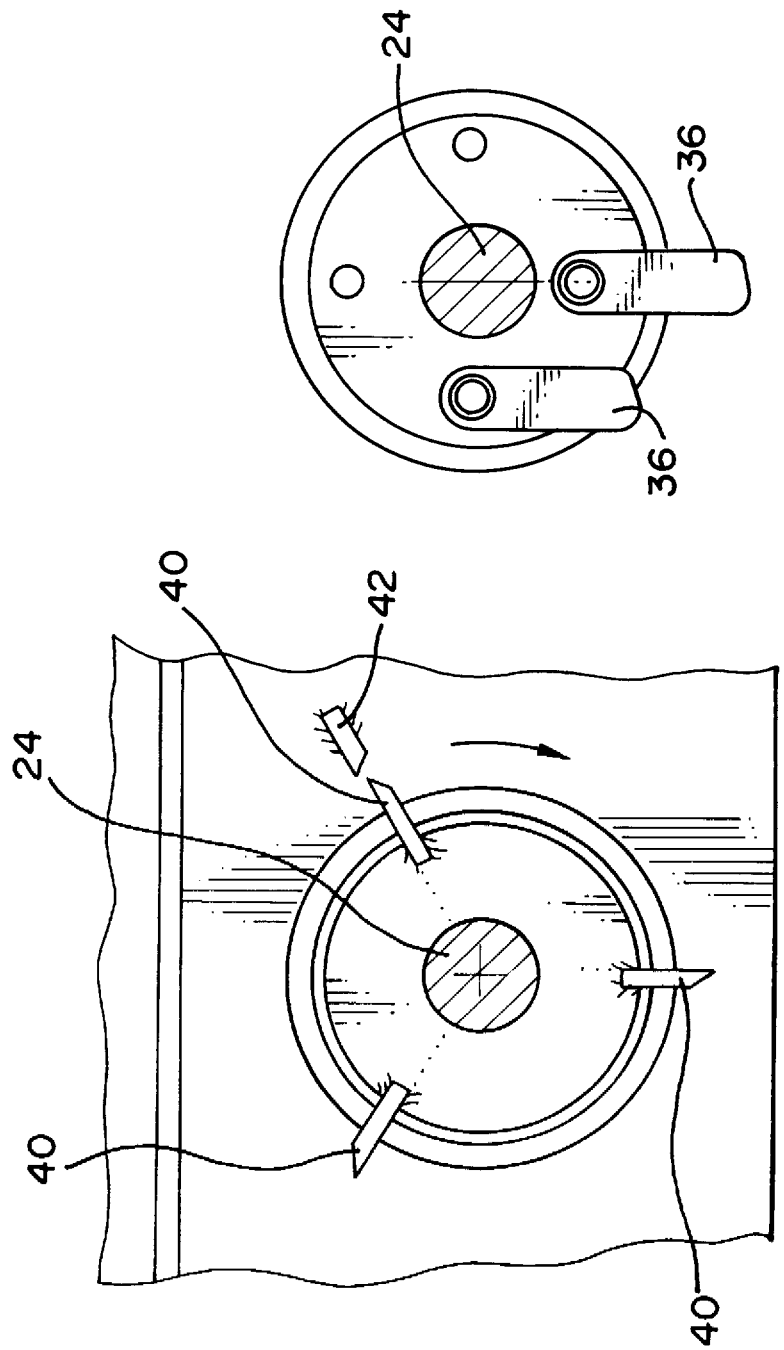
FIG. 4 is a cross-sectional view of the compacting and cutting portion of the present invention, taken along line 4—4 of FIG. 3 and showing the cutting means of the present invention.
FIG. 5 is a cross-sectional view of the compacting and cutting portion of the present invention, taken along line 5—5 of FIG. 3 and showing two compacting members connected to a spacing member.

Referring generally to FIGS. 2–5, the hammermill 12 located within housing 20 comprises a main shaft 24, a first or right shaft receiving member 26, a second or left shaft receiving member 28 (whereby the right end of the main shaft 24 is rotatably connected to the first or right shaft receiving member 26 and the left end of the main shaft 24 is rotatably connected to the second or left shaft receiving member 28), and a plurality of cylindrical spacing members 30 displaced at substantially equal distances along the main shaft 24. Each of the cylindrical spacing members 30 has therethrough at least one opening 32 (see FIG. 2), through which a shaft 34 (see FIG. 3) is passed. Rotatably connected to shaft 34 is a plurality of pulverizing or compacting members 36. (As shown in FIGS. 2 and 5, a portion of the compacting members 36 may be removed so as to increase the compacting efficiency of the remaining compacting members 36). In the embodiment shown, one compacting member 36 is located between each pair of cylindrical spacing members 30, and there is at least one shaft 34/compacting members 36 combination and preferably three such shaft 34/compacting members 36 combinations, whereby each combination is spaced a substantially equal distance from the others.

Figure 3:
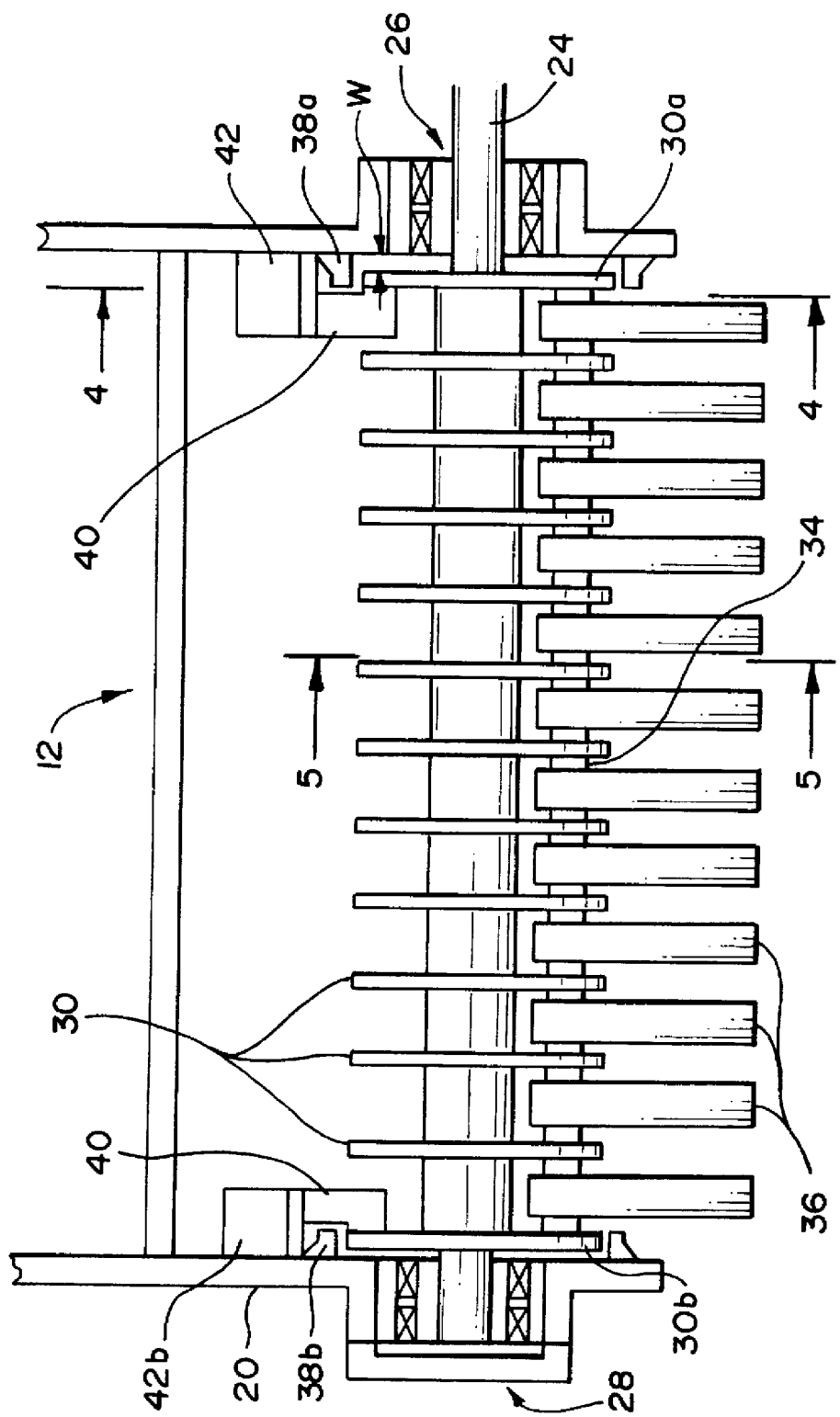
FIG. 3 is a front cutaway view of the present invention, showing the main shaft, compactor members, spacing members, and cutting means of the present invention.

Referring specifically to FIG. 3, the spacing member 30 that is closest to the side of the housing 20 having the first or right shaft receiving member 26 shall be referred to as the first or right spacing member 30a. The spacing member 30 that is closest to the side of the housing 20 having the second or left shaft receiving member 28 shall be referred to as the second or left spacing member 30b. Two annular members 38 are connected to opposite sides of the housing 20, so as to circumscribe the spacing members 30a and 30b. Preferably, the inner circumference of the annular members 38 is only slightly greater than the circumference of the spacing members 30a and 30b. Such difference should preferably be approximately less than ½ inch. For ease of reference, the annular member 38 circumscribing the right spacing member 30a shall be referred to as the right annular member 38a. The annular member 38 circumscribing the left spacing member 30b shall be referred to as the left annular member 38b. Referring now to FIG. 3, the width of the annular members 38 must be greater than the gap "w" between the wall of the housing 20 nearest the particular spacing member 30 so that the annular member 38 circumscribes the spacing member 30. Additionally, the width of the annular members 38 should be less than the combined thickness of the particular spacing member 30 and the gap "w", so that the annular members 38 do not overhang the respective spacing members 30.

Referring now to FIGS. 2–4, at least one and preferably three substantially rectangular cutting members 40 are connected to the sides of spacing members 30a and 30b that are distal annular members 38a and 38b, respectively. Where more than one cutting member 40 is used, such cutting members should preferably be spaced a substantially equal distance apart. The cutting members 40 should be oriented so that a first or proximate end points in the direction of the main shaft 24. As shown in FIGS. 2 and 4, the second or distal end of the cutting members 40 is angled to form a point. Connected to the wall of the housing 20 (as shown in FIG. 4) or to the wall of the housing 20 and an annular member 38 (as shown in FIG. 2) is a cutting member 42. As shown in FIG. 3, there is a cutting member 42a corresponding to annular member 38a and spacing member 30a, and a cutting member 42b corresponding to annular member 38b and spacing member 30b. Like the cutting members 40, the cutting members 42 are preferably rectangular and oriented so as to point towards the main shaft 24. The ends of each of the cutting members 42 that are proximate the main shaft 24 are angled.

Figure 6:
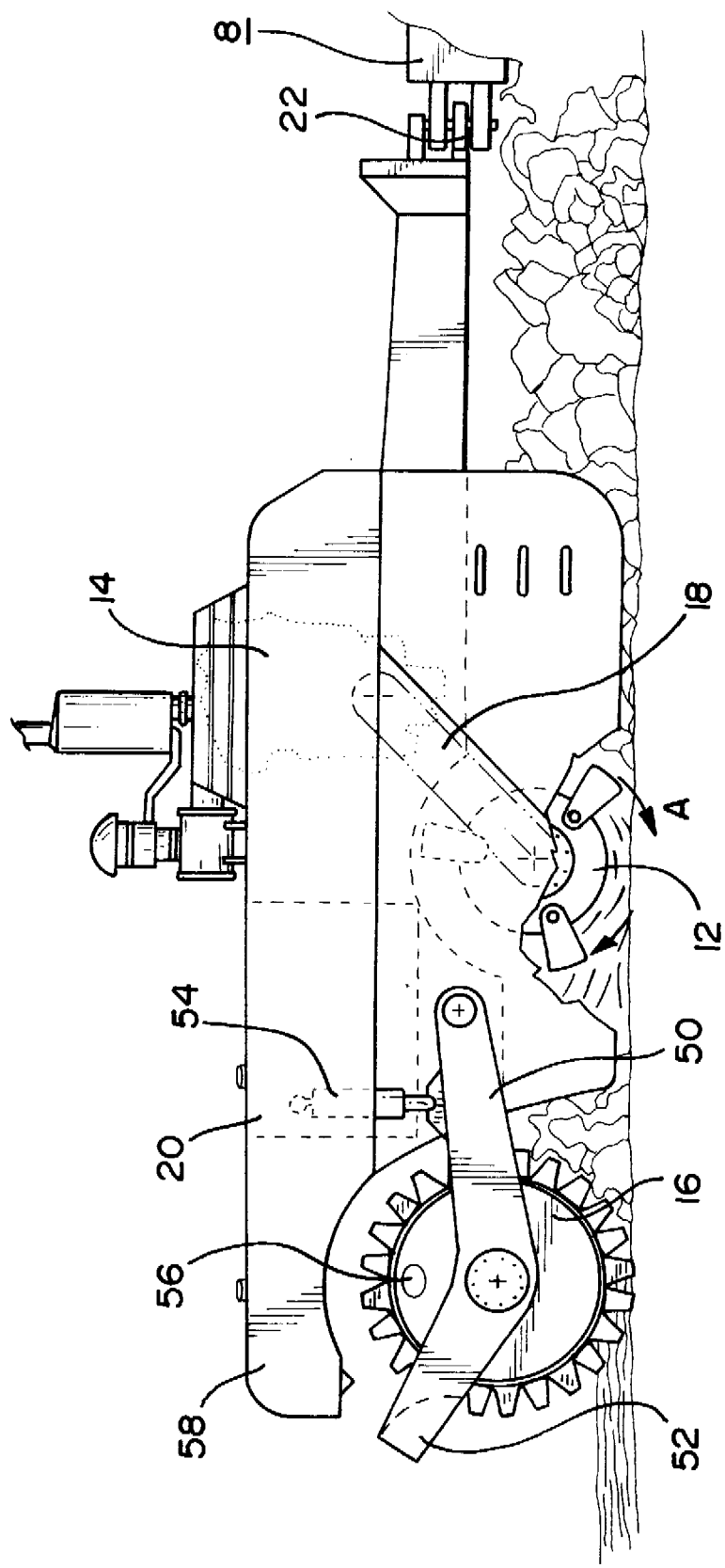
FIG. 6 is a side plan view of the towed embodiment of the present invention.

Referring now to FIGS. 1 and 6 the hammermill 12 is driven by power plant 14 through transmission 18 in the direction indicated by arrow "A" in FIG. 6. The sides of housing 20, which are shown partially cut away in FIG. 6 provide a shroud around hammermill 12, except where it opens at the bottom surface and to the rear. The bottom surface is open to permit the hammermill 12 to operate on the surface passing beneath. Housing 20 is open to the rear because a solid rear shroud would cause debris to accumulate behind the hammermill 12, which would impede the compactor apparatus 10 being moved across the landfill surface. A pair of suspension arms 50 (only one of which is shown in FIG. 6) are pivotally attached to the rear of housing 20. Compactor drum 16 is rotatingly attached to the distal ends of suspension arms 50. A pair of hydraulic cylinders 54 acting on suspension arms 50 urge suspension arms 50 downward as required by the operator to raise the compactor apparatus 10 so that hammermill 12 is at the desired height. A conventional drum comb 52 is attached to the ends of suspension arms 50 to free any debris that builds up on compactor drum 16.

Compactor drum 16 is preferably of heavy steel construction to withstand the punishment of operating in the intended environment. To increase the weight acting on compactor drum 16, additional ballast such as sand or water may be added to the interior volume of compactor drum 16 through filling port 56. To further increase weight, an auxiliary water tank 58 is provided in housing 20 which, in addition to providing additional ballast, provides a source of water for foggers, drip watering systems, or other similar dust suppression equipment.

Figure 7:
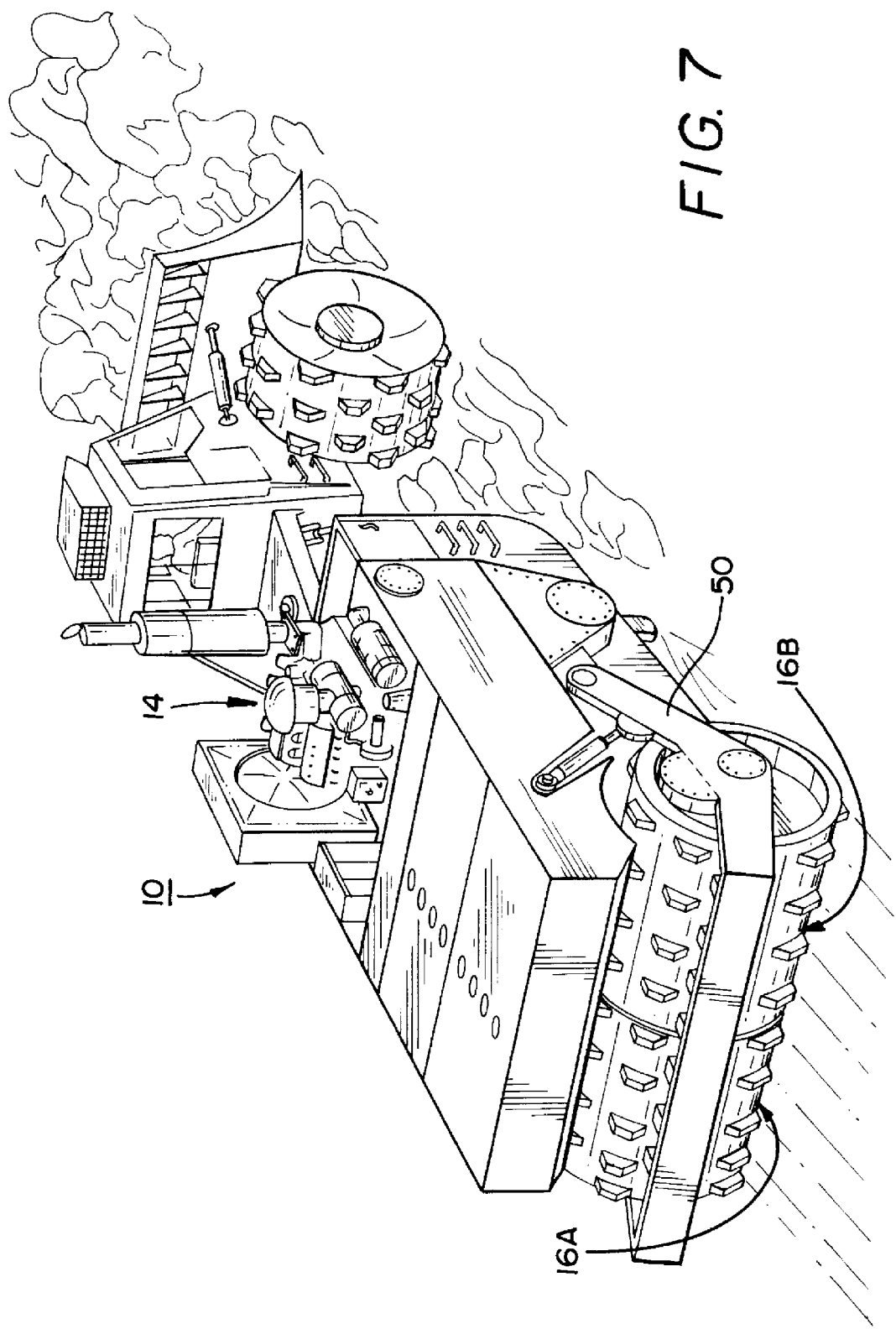
FIG. 7 is a perspective view of an embodiment of the present invention in which the combined mobile compactor, pulverizer and cutting apparatus of the present invention is self-propelled.
Figure 8:
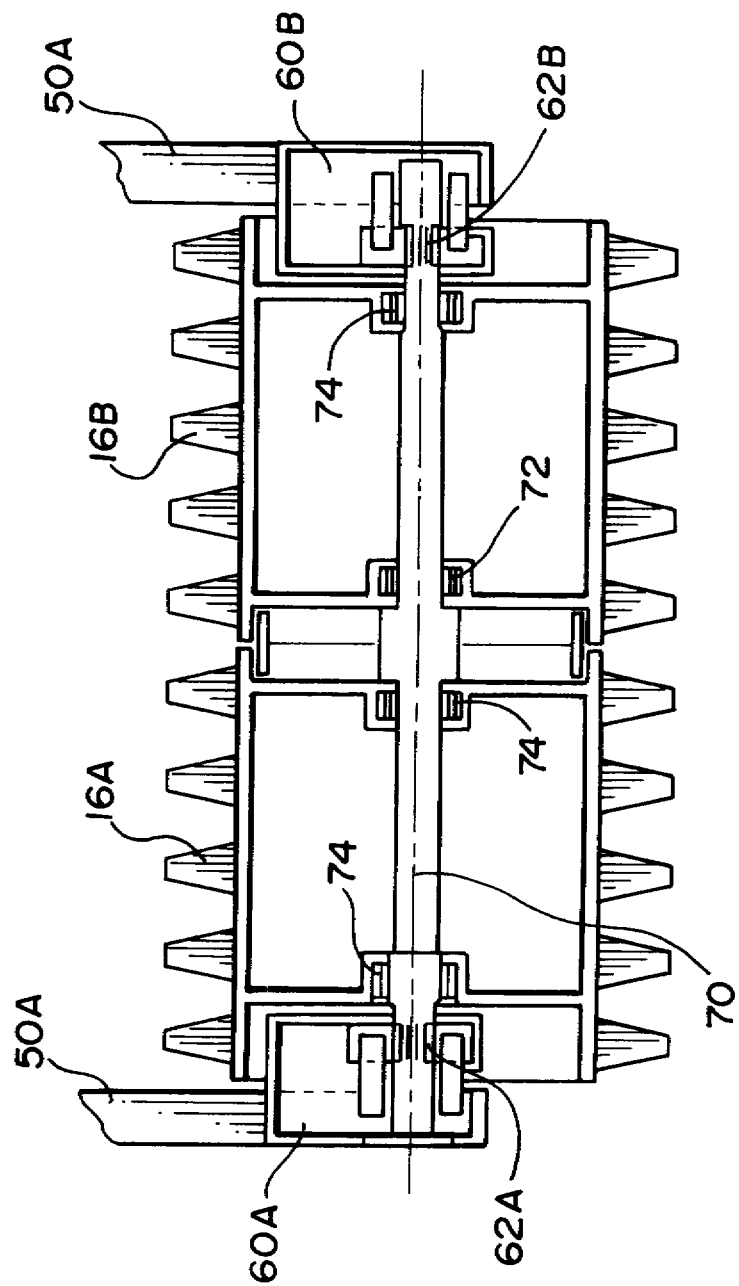
FIG. 8 is a partial plan view of a drive mechanism for the self-propelled embodiment of FIG. 7.

Referring to FIG. 7, an alternative embodiment comprises a self-propelled compactor apparatus 10 in which power plant 14 provides motive force both to the hammermill 12, and to a plurality of drive wheels. As shown in more detail in FIG. 8, to allow the self-propelled compactor apparatus 10 to negotiate tight turns, a split compactor drum 16A and 16B is provided. In the illustrative embodiment, compactor drum half 16A is non-rotatingly attached to axle 70, such as by splines 74. Axle 70, in turn, is driven by traction motor 60A via transmission 62A. Compactor drum half 16B is rotatingly supported on axle 70 by means of bearing 72 and is driven by traction motor 60B through transmission 62B. As can be appreciated by those skilled in the art, the foregoing arrangement permits the combined torque of traction motors 60A and 60B to move the compactor apparatus 10, while allowing some difference in rotational speed to allow the compactor apparatus 10 to negotiate corners. As can also be appreciated by those skilled in the art a conventional differential having outputs driving drum half 16A and 16B respectively can be substituted for the dual traction motors of FIG. 8 without departing from the spirit or scope of the present invention.

Additionally, a compactor drum assembly comprising three or more compacting drums arranged end-to-end in a manner similar to the compactor drum halves 16A and 16B is contemplated within the scope of the present invention, provided the total length of the end-to-end drums was substantially equal to or greater than the width of the hammermill 12 so that the combined assembly provides the appropriate shielding function. The decision whether to use three or more drums would involve a trade-off between maneuverability and added complexity of the more complex drive mechanism.

Operation of the Invention

During use, the compactor, pulverizer and cutting apparatus 10 of the current invention can, if desired, be towed by a tractor or other vehicle, or as discussed above, may be incorporated into a self-propelled vehicle. During operation, the power plant 14 will be running and the clutch and transmission apparatus engaged to drive the hammermill 12 in the direction indicated by arrow "A" in FIG. 6. As the hammermill 12 revolves about the main shaft 24, the compacting members 36 will rotate in the manner shown in FIG. 5, i.e., the heads of the compacting members 36 will continually be oriented predominantly toward the ground, and each respective row of compacting members 36 will, alternatingly, pound down into the ground and waste as the main shaft 24 turns.

As shown in FIG. 6, as compactor apparatus 10 moves across the surface of the landfill, the uncompacted debris enters the area of the hammermill 12, where it is pulverized by the rotating compacting members 36. Once pulverized, the debris is compacted by compacting drum 16, which rolls over the pulverized debris. Occasionally, a compacting member 36 will strike a solid object contained in the debris at an oblique angle, such that the object is propelled tangentially to rotating hammermill 12, rather than being driven downward. Since the rotation of hammermill 12 is direction indicated by arrow "A" such an oblique impact will result in the object being propelled rearward, rather than in some other direction. However, because compactor drum 16 extends the full width of the operating zone of the hammermill, (which is typically the majority of the width of compactor apparatus 10) any rearward trajectory of such an object will not result in the object being thrown clear of the compacting apparatus, but will simply result in the object striking the surface of compactor drum 16 and being deflected downward into the surface of the landfill.

Ideally, the hammermill 12 should rotate at approximately 900 revolutions per minute. Under these conditions, and with three rows of compacting members 36, the compactor, pulverizer and cutting apparatus 10 can pulverize landfill debris to such an extent that landfill densities in the range of 2400 pounds per cubic yard (1400 Kilograms per cubic meter) can be achieved. This compaction density is approximately twice the densities achievable by traditional compactors. Such increased efficiency permits the use of the compactor, pulverizer and cutting apparatus 10 to increase the useful life of an existing landfill and/or to further compress the waste on a closed landfill so that such closed landfill can be reopened. Moreover, where appropriate ballast is added to compactor drum 16, substantial increases in landfill densities can be achieve in only a single pass of the compactor apparatus 10, without the need for repeated passes with separate compacting equipment.

When wire, tubing, hoses, plastics, carpet, mattresses, or other like materials are encountered, such materials tend upon encountering the compacting members to work their way toward the walls of the housing 20. In the absence of some appropriate shielding means, these materials will get into contact with the shaft receiving members 26 and/or 28 and bring the operation of the hammermill 12 to a halt. Annular members 38 serve to shield the shaft receiving members 26 and 28, preventing these materials from interfering with the operation of the main shaft. Then, the wire, tubing, hoses, plastics, carpet, mattresses, and other materials are cut between the angled ends of the cutting members 40 and 42 as the respective cutting members 40 and 42 pass each other during the revolution of the main shaft 24. Preferably, the angled ends of cutting members 40 and 42 should not contact each other when passing by each other during operation of the machine, but should be positioned so that the angled ends pass closely by each other for increased cutting efficiency. The preferred distance between the angled ends is in the range of approximately 1/16 of an inch.

While the invention has been particularly shown and described with reference to preferred embodiments thereof, it will be understood by those skilled in the art that the foregoing and other changes in form and details may be made therein without departing from the spirit and scope of the invention.

What is claimed is:

1. Apparatus for pulverizing, cutting and compacting debris in a landfill or other surface comprising, in combination:

a housing comprising a substantially contiguous enclosure opening at a bottom surface thereof, said housing further comprising forward and rearward ends and a first and a second wall;

a substantially horizontal main shaft mounted within said housing disposed proximal said opening in said housing;

a first shaft receiving member and a second shaft receiving member located within said housing;

a first end of said main shaft being rotatably connected to said first shaft receiving member located within said first wall, and a second end of said main shaft being rotatably connected to said second shaft receiving member located within said second wall, said first and second walls of said housing being opposite each other;

a prime mover coupled to said main shaft for rotating said main shaft;

a plurality of spacing members disposed along said main shaft, said plurality of spacing members including a first spacing member located substantially at said first end of said main shaft, a second spacing member located substantially at said second end of said main shift, and multiple spacing members located between said first spacing member and said second spacing member;

each of said plurality of spacing members having at least two openings therethrough displaced substantially equal distances from each other, said openings through each of said plurality of spacing members being aligned with each other;

at least two rods displaced parallel to said main shaft, each of said rods passing through said openings in said plurality of spacing members;

a plurality of compacting members rotatably connected to each of said two rods said compacting members being capable of extending through said opening in said housing for striking a surface beneath said opening;

first and second suspension arms mounted proximal the rearward end of said housing;

a compacting drum assembly, said compacting drum assembly being rotatably attached about its axis to said first and second suspension arms, said compacting drum assembly and said first and second suspension arms cooperating to support at least a portion of the weight of said mobile compactor pulverizer and cutting apparatus, said compacting drum assembly being disposed adjacent and rearward of said main shaft and adapted to obstruct passage of any of said debris propelled rearward by said compacting members.

2. The apparatus of claim 1, further comprising:

means for adding ballast to said compacting drum assembly.

3. The apparatus of claim 1, further comprising:

a frame extension mounted to said forward end of said frame;

a coupling attached to said frame extension, whereby said apparatus is adapted to be towed by a vehicle.

4. The apparatus of claim 1, wherein:

said compacting drum assembly comprises a unitary drum.

5. The apparatus of claim 4, further comprising:

a traction motor adapted to drive said compacting drum assembly, whereby said apparatus for pulverizing, cutting and compacting debris is self propelled.

6. The apparatus of claim 5, further comprising:

a differential operatively coupled between said traction motor and said first and second compacting drums for permitting relative movement therebetween.

7. The apparatus of claim 1, wherein:

said compacting drum assembly comprises first and second compacting drums, said first and second compacting drums being rotatably attached respectively about their axes to said first and second suspension arms.

8. The apparatus of claim 1 further comprising:

a first annular member circumscribing said first end of said main shaft and connected to said first wall of said housing, said first annular member having a width that is greater than the distance between said first wall and a proximate side of one of said two spacing members that is located closest to said wall and less than the distance between said first wall of said housing and a distal side of said spacing member that is located closest to said first wall;

first cutting means connected to at least one of said first annular member and said first wall for cutting or slicing wiring, tubing, hoses, carpet, plastics, mattresses, and other debris;

second cutting means connected to said distal side of said one of said two spacing members that is located closest to said first wall for cutting or slicing wiring, tubing, hoses, carpet, plastics, mattresses, and other debris in combination with said first cutting means;

a second annular member circumscribing said second end of said main shaft and connected to said second wall of said housing, said second annular member having a width that is greater than the distance between said second wall and a proximate side of said other of said two spacing members that is located closest to said second wall and less than the distance between said second wall of said housing and a distal side of said other of said two spacing members that is located closest to said second wall;

third cutting means connected to at least one of said second annular member and said second wall for cutting or slicing wiring, tubing, hoses, carpet, plastics, mattresses, and other debris; and fourth cutting means connected to said distal side of said other of said two spacing members that is located closest to said second wall for cutting or slicing wiring, tubing, hoses, carpet, plastics, mattresses, and other debris in combination with said third cutting means.

9. The combined mobile compactor, pulverizer and cutting apparatus of claim 8 wherein each of said plurality of spacing members has three openings therethrough displaced substantially equal distances from each other;

said three openings in each of said plurality of spacing members aligned with the corresponding three openings in all the other of said plurality of spacing members and having a separate rod passing through each of said three aligned openings; and a plurality of compacting members rotatably connected to each separate rod, each of said plurality of compacting members located between two of said plurality of spacing members.

10. The combined mobile compactor, pulverizer and cutting apparatus of claim 8 wherein said first cutting means comprises a substantially rectangular member oriented in the direction of said main shaft, an end of said first cutting means located closest to said main shaft being angled.

11. The combined mobile compactor, pulverizer and cutting apparatus of claim 8 wherein said second cutting means comprises at least one substantially rectangular member oriented in the same direction as said first cutting means, an end of said second cutting means located farthest from said main shaft being angled.

12. The combined mobile compactor, pulverizer and cutting apparatus of claim 8 wherein said third cutting means comprises a substantially rectangular member oriented in the direction of said main shaft, an end of said third cutting means located closest to said main shaft being angled.

13. A combined mobile compactor, pulverizer and cutting apparatus comprising, in combination:

a plurality of rotatable compacting members mounted between two spaced apart walls of said apparatus for compacting material coming in contact with said plurality of rotatable compacting members;

a housing comprising a substantially contiguous enclosure opening at a bottom surface thereof, said housing further comprising forward and rearward ends and a first and a second wall;

a substantially horizontal main shaft mounted within said housing disposed proximal said opening in said housing;

a first shaft receiving member and a second shaft receiving member located within said housing;

a first end of said main shaft being rotatably connected to said first shaft receiving member located within said first wall, and a second end of said main shaft being rotatably connected to said second shaft receiving member located within said second wall, said first and second walls of said housing being opposite each other;

a prime mover coupled to said main shaft for rotating said main shaft;

a plurality of pivotable compacting members pivotally mounted eccentrically to said main shaft for compacting material coming in contact with said plurality of pivotable compacting members; and a compactor drum assembly rotatably attached proximal the rear of said apparatus for supporting at least a portion of the weight of said apparatus, said compactor drum assembly being disposed adjacent and at least partly exposed to said plurality of rotatable members, said compactor drum assembly being adapted to deflect a portion of said material which is propelled at said compactor drum after coming in contact with said plurality of rotatable compacting members.

14. The combined mobile compactor, pulverizer and cutting apparatus of claim 13 wherein:

said compacting drum assembly comprises first and second compacting drums adjacent one another, said first and second compacting drums being rotatably attached respectively about substantially co-linear axes.

15. The combined mobile compactor, pulverizer and cutting apparatus of claim 13 further comprising:

a traction motor adapted to drive said compacting drum assembly, whereby said mobile compactor, pulverizer and cutting apparatus is self-propelled.

16. A method for compacting and cutting waste and soil comprising the steps of:

providing a substantially horizontal main shaft located within a housing;

providing a first shaft receiving member and a second shaft receiving member located within said housing;

rotatably connecting a first end of said main shaft to said first shaft receiving member located in a first wall of said housing and rotatably connecting a second end of said main shaft to said second shaft receiving member located in a second wall of said housing, said first and second walls of said housing being opposite each other;

providing a plurality of spacing members displaced at substantially equal distances along said main shaft, said plurality of spacing members including a first spacing member located substantially at said first end of said main shaft, a second spacing member located substantially at said second end of said main shaft, and a plurality of spacing members located between said first spacing member and said second spacing member;

providing at least two openings through each of said plurality of spacing members displaced substantially equal distances from each other and aligning said openings through each of said plurality of spacing members with corresponding said at least two openings in each other of said plurality of spacing members;

providing at least two shafts displaced parallel to said main shaft, each of said shafts passing through said aligned openings in said plurality of spacing members;

providing a plurality of compacting members rotatably connected to each of said two shafts;

providing a compacting drum assembly operatively attached to said apparatus rearward of said main shaft;

transporting said apparatus across a surface of a landfill;

rotating said main shaft to bring said compacting members into contact with said surface of said landfill for pulverizing said surface of said landfill and thereafter compacting said landfill with said compacting drum assembly.

17. The method of claim 16 further including:

providing two of said plurality of spacing members bounding said plurality of compacting members, each of said plurality of compacting members located between said two spacing members;

providing a first annular member circumscribing said first end of said main shaft and connected to said first wall of said housing, said first annular member having a width that is greater than the distance between said first wall and a proximate side of one of said two spacing members that is located closest to said wall and less than the distance between said first wall of said housing and a distal side of said spacing member that is located closest to said first wall;

connecting first cutting means to at least one of said first annular member and said first wall for cutting or slicing wiring, tubing, hoses, carpet, plastics, mattresses, and other debris;

connecting second cutting means to said distal side of said one of said two spacing members that is located closest to said first wall for cutting or slicing wiring, tubing, hoses, carpet, plastics, mattresses, and other debris in combination with said first cutting means;

providing a second annular member circumscribing said second end of said main shaft and connected to said second wall of said housing, said second annular member having a width that is greater than the distance between said second wall and a proximate side of said other of said two spacing members that is located closest to said second wall and less than the distance between said second wall of said housing and a distal side of said other of said two spacing members that is located closest to said second wall;

connecting third cutting means to at least one of said second annular member and said second wall for cutting or slicing wiring, tubing, hoses, carpet, plastics, mattresses, and other debris; and connecting fourth cutting means to said distal side of said other of said two spacing members that is located closest to said second wall for cutting or slicing wiring, tubing, hoses, carpet, plastics, mattresses, and other debris in combination with said third cutting means.

18. The method of claim 16 wherein said step of providing said plurality of spacing members further comprises the steps of:

providing three openings through each of said plurality of spacing members displaced substantially equal distances from each other;

aligning said three openings through each of said plurality of spacing members with the corresponding said three openings in each other of said plurality of spacing members and having a separate rod passing through each of said three aligned openings; and rotatably connecting a plurality of compacting members to each said separate rod, each of said plurality of compacting members located between two of said plurality of spacing members.

19. The method of claim 18 wherein said second cutting means comprises at least one substantially rectangular member oriented in the same direction as said first cutting means, an end of said second cutting means located farthest from said main shaft being angled.

20. The method of claim 16 wherein said first cutting means comprises a substantially rectangular member oriented in the direction of said main shaft, an end of said first cutting means located closest to said main shaft being angled.

21. The method of claim 20 wherein said second cutting means comprises three substantially rectangular members oriented in the same direction as said first cutting means, an end of each of said three substantially rectangular members of said second cutting means located farthest from said main shaft being angled.

22. The method of claim 20 wherein said third cutting means comprises a substantially rectangular member oriented in the direction of said main shaft, an end of said third cutting means located closest to said main shaft being angled.

23. The method of claim 16 wherein said second cutting means comprises at least one substantially rectangular member oriented in the same direction as said first cutting means, an end of said second cutting means located farthest from said main shaft being angled.

24. The method of claim 23 wherein said fourth cutting means comprises at least one substantially rectangular member oriented in the same direction as said third cutting means, an end of said fourth cutting means located farthest from said main shaft being angled.

25. The method of claim 16 wherein said third cutting means comprises a substantially rectangular member oriented in the direction of said main shaft, an end of said third cutting means located closest to said main shaft being angled.

26. The method of claim 25 wherein said fourth cutting means comprises three substantially rectangular members oriented in the same direction as said second cutting means, an end of each of said three substantially rectangular members of said fourth cutting means located farthest from said main shaft being angled.

27. The method of claim 16 wherein said fourth cutting means comprises at least one substantially rectangular member oriented in the same direction as said third cutting means, an end of said fourth cutting means located farthest from said main shaft being angled.

28. The method of claim 16 further comprising the step of coupling a motorized vehicle to said combined mobile compactor, pulverizer and cutting apparatus.

29. A method for compacting and cutting waste and soil comprising the steps of:

providing a substantially horizontal main shaft located within a housing;

providing a first shaft receiving member and a second shaft receiving member located within said housing;

rotatably connecting a first end of said main shaft to said first shaft receiving member located in a first wall of said housing and rotatably connecting a second end of said main shaft to said second shaft receiving member located in a second wall of said housing, said first and second walls of said housing being opposite each other;

pivotally mounting a plurality of compacting members eccentrically about said main shaft between said first and second walls;

rotating said main shaft at a high rotational speed for causing said compacting members to compact material coming in contact with said plurality of compacting members;

mounting a plurality of rotatable cuffing means between two spaced apart walls of said apparatus for cutting said material coming in contact with said plurality of rotatable compacting members; and connecting a compactor drum means to said apparatus for compacting said material after said material has come in contact with said plurality of rotatable compacting members.

30. The method of claim 29, further comprising:

connecting annular shield means to said first and second walls for preventing material that is being compacted and cut by said apparatus from interfering with and slowing down rotation of both said plurality of compacting member means.

* * * * *